R. E. HAMMER.
VEHICLE SPRING.
APPLICATION FILED MAR. 5, 1915.
1,147,503.
Patented July 20, 1915.
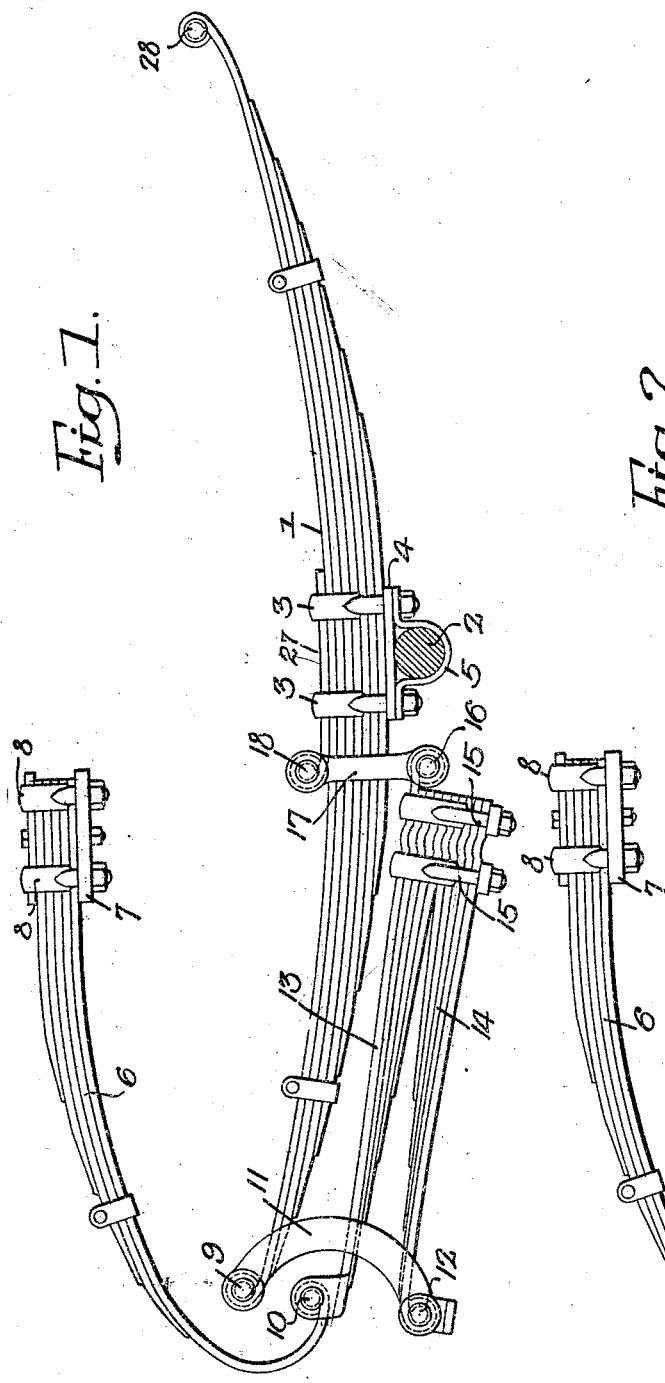
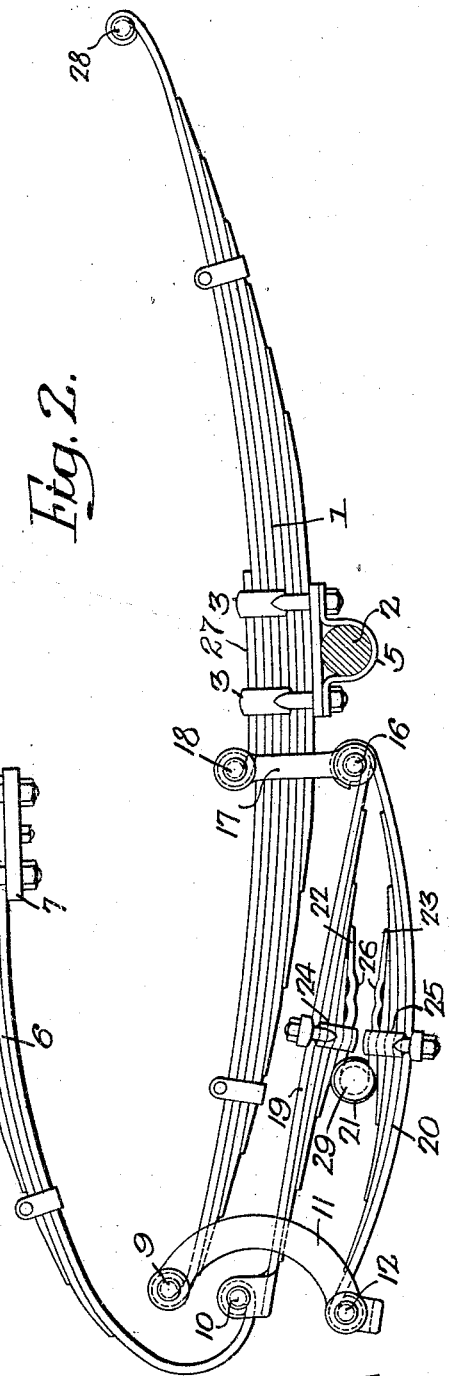
Witnesses—
Jacob F. Woessner
Hill A. Burrows
Inventor—
Robert E. Hammer.
by his Attorneys—
Howson & Howson

UNITED STATES PATENT OFFICE.

ROBERT E. HAMMER, OF PHILADELPHIA, PENNSYLVANIA.

VEHICLE-SPRING.

1,147,503.  Specification of Letters Patent.  Patented July 20, 1915.

Application filed March 5, 1915. Serial No. 12,381.

*To all whom it may concern:*

Be it known that I, ROBERT E. HAMMER, a citizen of the United States, residing in Philadelphia, Pennsylvania, have invented certain Improvements in Vehicle-Springs, of which the following is a specification.

One object of my invention is to provide a novel form of auxiliary spring for connection between two parts of a main vehicle spring for absorbing or preventing shocks due to rough roads, etc.; the arrangement being such that the device is inconspicuous, inexpensive, and easily applicable to existing constructions without requiring material change thereof. These objects and other advantageous ends I attain as hereinafter set forth, reference being had to the accompanying drawings, in which, Figure 1 is a front elevation showing an axle in section and illustrating a main vehicle spring with one form of my invention applied thereto; and Fig. 2 is an elevation similar to Fig. 1 illustrating another form of the invention.

In the above drawings, 1 represents a semi-elliptical leaf spring which at its center is supported upon an axle 2 and is held in place by a pair of spring clips 3 whose ends pass through a bearing plate 4 and a strap 5. The latter extends around the axle and is held in place by nuts on the clips. In addition to this lower member of the main spring there is a quarter-elliptical leaf spring 6 held to a bracket 7 attached to the body of a vehicle by a pair of clips 8. The long leaves of these two spring members are customarily connected by shackles extending between two pivot bolts 9 and 10 respectively carried by said members, it being noted that the long leaf of the spring 6 is curved down and under the extremity of the long leaf of the spring 1.

In that form of my invention shown in Fig. 1, I provide shackles 11 held by the pivot bolt 9 to the extremity of the long leaf of the spring member 1 so as to extend downwardly on opposite sides thereof and connect the lower ends of these two shackles by a pivot pin 12. Between this latter pin and the pin 10 I mount a pair of leaf springs 13 and 14, each of which is made up of a series of leaves of decreasing length and rigidly connected together at their large ends by a pair of spring clips 15, their small ends being provided with eyes for the reception of the pivot bolts 10 and 12. In this case the long leaf of the member 13 of this double auxiliary spring has its second extremity provided with an eye for the reception of a pivot bolt 16 whereby it is connected to the lower ends of shackles 17 extending on opposite sides of the main spring member 1, from which it is hung by a second pivot bolt 18 passing through the eye of a plate held in place by the clips 3.

In that form of my invention shown in Fig. 2 the auxiliary spring as before consists of two members indicated at 19 and 20 of which one has an end connected to the shackles 11 and the other has its adjacent end connected by the pivot bolt 10 to the upper main spring member 6, as described in connection with Fig. 1. Instead of being formed as in the first case so that the number of leaves increases from the thin end to their point of connection with the pivot pin 16, as in Fig. 1, these auxiliary members are made to decrease in thickness from their middle points in both directions to their ends and are arranged to fulcrum one upon the other adjacent said middle points. For this purpose I provide a suitable form of fulcrum member in the form of a hinge 21 having leaves 22 and 23 respectively held to the central parts of the spring members 19 and 20 by clips 24 and 25 which also serve to hold together the leaves of these springs, and pivotally connected by a bolt 29.

In order to avoid the use of bolts passed through the spring members 19 and 20 for the purpose of holding together their individual leaves, the latter are each slightly raised on one face and depressed on the opposite face preferably at their middle points or at other points adjacent the clips 24 and 25 so that the said leaves are effectually prevented from independent longitudinal as well as lateral movement.

The leaves 22 and 23 of the hinge forming the fulcrum member 21 are each formed with a series of corrugations or transverse depressions 26 on their outer surfaces and these depressions are so shaped as to fit over the raised central portions of the adjacent leaves of the spring members 19 and 20 to which they are held by the clips 24 and 25. By slacking off the clip nuts the member 21 may be moved nearer to or farther from them and it is held in any adjusted position so that it cannot move longitudinally of the springs by reason of the corrugations 26 fitting the raised parts of the leaves which they By this adjustment of the fulcrum member 21 the resistance of the auxiliary spring members 19 and 20 to a load may be adjusted at will, and if desired the leaves of the auxiliary spring members 13 and 14 may likewise be provided with complementary depressions and raised portions between the two clips 15 in order to prevent their relative longitudinal movement.

While in the drawings I have shown the shackles 17 as connected by the bolt or pin 18 to an eye formed at one extremity of a plate 27 it is obvious that other means may be provided for connecting to or supporting said shackles 17 from the main spring member 1 without departing from my invention.

In any case, when a load is applied to the thick end of the main spring member 6 it is transmitted through the two auxiliary spring members 13 and 14 or 19 and 20, to the lower ends of the shackles 11 and by them transmitted to the thin end of the main spring member 1, thereby serving to prevent the transmission of shocks from the axle 2 to the bracket 7 connected to the body. It will be noted that where in Fig. 1 the thin portions of the auxiliary spring members 13 and 14 are connected together so as to transmit a load from the pivot pin 10 to the pivot pin 12, they are similarly connected in Fig. 2 through the medium of the fulcrum member 21, although in the latter case they are extended beyond their thin portions to provide resilient structures between said parts and the shackles 17, where in Fig. 1 such connection is rigid or non-resilient.

I claim:—

1. The combination with two main spring members of two auxiliary spring members each formed of a series of leaves of successively diminishing lengths rigidly connected together at one end; and means at said end for connecting said auxiliary spring members to one of the main spring members adjacent the middle thereof, said means including an extension from one of said auxiliary spring members; a plate mounted on one of said main spring members; and a link pivotally connecting said extension and said plate, the opposite ends of the auxiliary spring members being connected respectively to adjacent ends of the two main spring members.

2. The combination of two main leaf spring members having their thin ends adjacent each other but spaced apart; a plate mounted on one of said members adjacent its middle and having an eye; two auxiliary leaf spring members of which one has an extension including an eye; a shackle connecting said two eyes; means for connecting together the thick portions of the auxiliary spring members; and links connecting one of said auxiliary spring members with the thin end of one of the main spring members, the second auxiliary spring member being connected to the thin end of the second main spring member.

3. The combination of two main leaf spring members having thin ends adjacent each other but spaced apart; two auxiliary leaf springs each tapering from its middle to its ends; means for connecting two adjacent ends of said auxiliary spring members to the adjacent thin ends of the main spring members; means for connecting together the other ends of the auxiliary spring members; means for connecting said latter ends to one of the main spring members adjacent the middle thereof; with a fulcrum member mounted between said auxiliary spring members adjacent their middle points.

4. The combination of two main spring members having thin ends adjacent each other but spaced apart; an auxiliary leaf spring tapering from its middle to its ends, having one of said ends connected to the thin end of one of the main spring members and its other end connected to the second main spring member adjacent the middle thereof; a second auxiliary spring member having one end connected to the thin end of the second main spring member and its opposite end connected both to the second main spring member adjacent the middle thereof and also to the adjacent end of the first auxiliary spring member; with a fulcrum member mounted between the central portions of said auxiliary spring members.

5. The combination of two auxiliary spring members each tapering from its middle to its ends; a fulcrum member adjustably mounted between said auxiliary springs and engaging the middle portions thereof; two main leaf spring members of which one has a thin end connected to the thin end of one of the auxiliary spring members and the other has its thin end connected to a thin end of the second auxiliary spring member; and means for connecting the other ends of the auxiliary spring members to each other and to one of the main spring members adjacent the middle thereof.

In testimony whereof, I have signed my name to this specification, in the presence of two subscribing witnesses.

ROBERT E. HAMMER.

Witnesses:
WILLIAM E. BRADLEY,
WM. A. BARR.